United States Patent
Choi et al.

(10) Patent No.: US 11,858,820 B2
(45) Date of Patent: Jan. 2, 2024

(54) MN₄C MANGANESE CARBIDE MAGNETIC SUBSTANCE AND MANUFACTURING METHOD THEREFOR

(71) Applicant: KOREA INSTITUTE OF MATERIALS SCIENCE, Changwon-si (KR)

(72) Inventors: Chul Jin Choi, Changwon-si (KR); Ping Zhan Si, Liaoning (CN); Ji Hoon Park, Changwon-si (KR); Hui Dong Qian, Changwon-si (CN)

(73) Assignee: KOREA INSTITUTE OF MATERIALS SCIENCE, Changwon-si (KR)

(*) Notice: Subject to any disclaimer, the term of this patent is extended or adjusted under 35 U.S.C. 154(b) by 847 days.

(21) Appl. No.: 16/764,768

(22) PCT Filed: Nov. 15, 2018

(86) PCT No.: PCT/KR2018/014025
§ 371 (c)(1),
(2) Date: Oct. 6, 2020

(87) PCT Pub. No.: WO2019/098716
PCT Pub. Date: May 23, 2019

(65) Prior Publication Data
US 2021/0017030 A1   Jan. 21, 2021

(30) Foreign Application Priority Data

Nov. 15, 2017   (KR) .................. 10-2017-0152556

(51) Int. Cl.
*C01B 32/914*   (2017.01)
*C01B 32/182*   (2017.01)
(Continued)

(52) U.S. Cl.
CPC .......... *C01B 32/914* (2017.08); *C01B 32/158* (2017.08); *C01B 32/182* (2017.08);
(Continued)

(58) Field of Classification Search
CPC .. C01B 3/48; C01B 3/384; C01B 3/56; C01B 35/128; C01B 2203/0233;
(Continued)

(56) References Cited

U.S. PATENT DOCUMENTS 6,787,121 B1* 9/2004 Ostrovski ............... C22B 47/00
423/439

OTHER PUBLICATIONS

Tagawa et al. "Electronic band structures and magnetism of intermetallic manganese compounds Mn4X (X=N, C)" J. Phys.: Condens. Matter 3 (1991) 1753-1761. (Year: 1991).*
(Continued)

*Primary Examiner* — Steven J Bos
*Assistant Examiner* — Syed T Iqbal
(74) *Attorney, Agent, or Firm* — Hauptman Ham, LLP (57) ABSTRACT

A manganese carbide ($Mn_4C$) magnetic material and a production method therefor are provided. According to one embodiment, the saturation magnetization of the $Mn_4C$ magnetic material increases with increasing temperature, and thus the $Mn_4C$ magnetic material is applicable to fields in which thermally induced magnetization reduction is critical.

11 Claims, 6 Drawing Sheets

(51) Int. Cl.
*C01B 32/158* (2017.01)
*C01B 32/20* (2017.01)
*C01G 45/00* (2006.01)
*C22C 22/00* (2006.01)

(52) U.S. Cl.
CPC .............. *C01B 32/20* (2017.08); *C01G 45/00* (2013.01); *C22C 22/00* (2013.01); *C01P 2002/72* (2013.01); *C01P 2006/42* (2013.01)

(58) Field of Classification Search
CPC ..... C01B 2203/0283; C01B 2203/0811; C01B 2203/1241; C01B 2203/86; C01B 3/348; C01B 2203/0415; C01B 2203/0475; C01B 3/38; B01D 53/62; B01D 53/80; B01D 53/96; B01D 2251/302; B01D 2251/304; B01D 2251/60; B01D 2257/504; Y02C 20/40; Y02P 20/133; Y02P 30/00
See application file for complete search history.

(56) References Cited

OTHER PUBLICATIONS

Isobe "The 674th report of the Research Institute fro Iron, Steel and Other metals. Tohoku University" 1951 pp. 468-490 (Year: 1951).*

* cited by examiner

MN₄C MANGANESE CARBIDE MAGNETIC SUBSTANCE AND MANUFACTURING METHOD THEREFOR

CROSS-REFERENCE TO RELATED APPLICATION

The present application is a national stage filing under 35 U.S.C § 371 of PCT application number PCT/KR2018/014025 filed on Nov. 15, 2018 which is based upon and claims the benefit of priorities to Korean Patent Application No. 10-2017-0152556, filed on Nov. 15, 2017 in the Korean Intellectual Property Office, which are incorporated herein in their entireties by reference.

TECHNICAL FIELD

The present disclosure relates to a manganese carbide ($Mn_4C$) magnetic material and a production method therefor, and particularly, to a high-purity manganese carbide ($Mn_4C$) magnetic material and a production method therefor.

BACKGROUND ART

It has been conducted several theoretical and experimental studies on the structure, magnetic properties and production method of $Mn_4C$ in the last century. However, since $Mn_4C$ is unstable at room temperature, most previous attempts to produce pure $Mn_4C$ have been failed because the precursors of Mn and C need high temperature melting to obtain homogenous alloys. Consequently, the physical and magnetic properties of $Mn_4C$ were unknown.

Early attempts to produce the face-centered-cubic $Mn_4C$ can be traced back to 1954 when Morgan found that an induction melted alloy with a nominal composition of $Mn_4C$ was weakly ferromagnetic after water quenching from 1323 K (see E. R. Morgan, JOM 6, 983 (1954)). A fraction of 70% was separated as a magnetic material by using magnetic separation process, and the separated product was regarded as $Mn_4C$. However, the obtained $Mn_4C$ was later suggested to be $Mn_4(C,O)$ as the quenching process was performed in open space. In addition, Karen et al. revealed that water quenching of samples with nominal compositions between $Mn_5C$ and $Mn_{23}C_6$ from a temperature of 1,523 K invariably gave a mixture of Mn and $Mn_{23}C_6$ (see P. Karen, H. Fjellvag, A. Kjekshus, and A. F. Andresen, Acta Chem. Scand. 45, 549 (1991)).

Meanwhile, $Mn_4C$ has a simple cubic perovskite crystal structure, similar to $Mn_4N$ in crystal structure.

Figure 1:
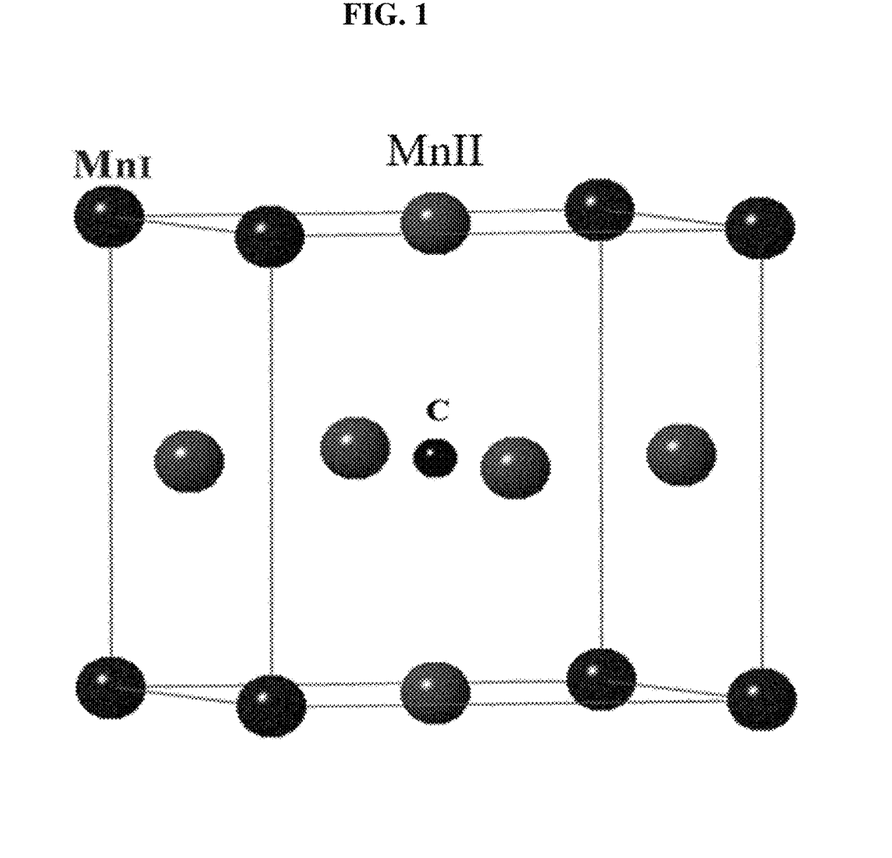
FIG. 1 is a view schematically illustrating the crystal structure of $Mn_4C$.

FIG. 1 schematically shows the crystal structure of $Mn_4C$. As shown in FIG. 1, the chemical formula of $Mn_4C$ can be written as $(Mn_{II})_3Mn_IC$, where $Mn_I$ is the corner atom of the crystal structure, $Mn_{II}$ is three face-centered atoms, and the carbon is located at the body-centered position of the crystal structure. The $Mn_{II}$ atoms which surround the C atoms octahedrally are strongly bonded to C atoms. Therefore, $Mn_{II}$ atoms are chemically stable.

The magnetization of most materials decreases with increasing temperature within a temperature range without structural or magnetic phase transitions. For example, FeRh, which is antiferromagnetic at room temperature and ferromagnetic at elevated temperatures, is metamagnetic within a very narrow temperature range, and the magnetization enhancement occurs at the phase transition temperature. The degradation of magnetic properties at elevated temperature has mainly limited the working temperature of the commercial Nd—Fe—B magnetic material. It is highly preferred to find materials that can resist thermal deterioration of magnetization at elevated temperatures. Although the magnetization of some ferrimagnets ($Y_3Ga_xFe_{5-x}O_{12}$) for instance, may increase with increasing temperature, such behaviors in these materials usually vanish at temperatures above room temperature.

DISCLOSURE

Technical Problem

The present disclosure is intended to provide a manganese carbide ($Mn_4C$), which is stable within the working temperature range and the magnetization of which increases with increasing temperature within a certain temperature range, and a production method therefor.

Technical Solution

In accordance with one aspect of the present disclosure, it is provided a $Mn_4C$ magnetic material showing main diffraction peaks of (111), (200), (220), (311) and (222) crystal planes at $2\theta$ values of 40°, 48°, 69°, 82° and 88°, respectively, in an XRD analysis.

In accordance with another aspect of the present disclosure, it is provided a method for producing the $Mn_4C$ magnetic material, including:
  melting a mixture of manganese and carbon-based compound to obtain a metal mixture;
  cooling the melted mixture to produce an alloy ingot; and
  crushing the alloy ingot, and then removing impurities by magnetic separation.

Advantageous Effects

The magnetization of the $Mn_4C$ according to one embodiment of the present disclosure increases linearly with increasing temperature. For this reason, the magnetization of the $Mn_4C$ may be prevented from decreasing due to thermal agitation, and the $Mn_4C$ may be used in fields that require thermal stability of magnetization.

BEST MODE

Hereinafter, the present disclosure will be described in detail.

A $Mn_4C$ magnetic material according to one aspect of the present disclosure shows main diffraction peaks of (111), (200), (220), (311) and (222) crystal planes at 2θ values of 40°, 48°, 69°, 82° and 88°, respectively, in an XRD analysis. The strong diffraction peaks of $Mn_4C$ mean that the $Mn_4C$ magnetic material is a high-purity $Mn_4C$. For example, it may have a purity of 95% or more. Thus, according to one embodiment of the present disclosure, the diffraction peak intensity at 2θ values of 43° and 44°, which correspond to impurities, may be 2.5% or less, for example, 2.0% or less, of the diffraction peak intensity of the (111) crystal plane in XRD analysis.

The magnetization of the $Mn_4C$ magnetic material according to one embodiment of the present disclosure may start to increase in a temperature range of 30 K to 80 K, for example, 50 K to 70 K, and the increased magnetization may be maintained in a temperature range of 540 K to 640 K, for example, 560 K to 600 K. Thus, the $Mn_4C$ magnetic material according to one embodiment of the present disclosure may maintain a stable magnetization state within the working temperature range.

A method for producing a $Mn_4C$ magnetic material according to another aspect of the present disclosure includes: melting a mixture of manganese and carbon-based compound to obtain a melted mixture; cooling the melted mixture to produce an alloy ingot; and crushing the alloy ingot, and then removing impurities by magnetic separation.

The manganese and carbon-based compound that are used in the method may preferably have high purity to obtain a high-purity $Mn_4C$.

The carbon-based compound may be one or more selected from graphite, graphene, carbon nanotubes, and carbon fibers.

The mixture of manganese and the carbon-based compound may include 93 to 97 wt % of manganese and 3 to 7 wt % of the carbon-based compound. For example, it may include 94 to 96 wt % of manganese and 4 to 6 wt % of the carbon-based compound, or 95 to 96 wt % of manganese and 4 to 5 wt % of the carbon-based compound. When manganese and the carbon-based compound are used in amounts within the above ranges, the amount of unreacted raw materials may be reduced, and a $Mn_4C$ having a desired composition ratio may be easily produced.

A melting method that is used for the melting is not particularly limited, but the melting may be performed by, for example, a plasma arc melting method.

The melting may be performed at a temperature of 1,500 to 2,500 K, for example, 1,700 to 2,300 K, or 1,800 to 2,000 K, under an inert atmosphere.

Thereafter, the produced melted mixture may be cooled to a temperature of 200 K to 300 K at a cooling rate of $10^2$ K/min to $10^5$ K/min, for example, $10^3$ K/min to $10^5$ K/min, or $10^4$ K/min to $10^5$ K/min, thereby producing a manganese carbide alloy ingot. A manganese carbide ($Mn_4C$) magnetic material having a desired purity may be obtained by crushing and powdering the alloy ingot, and then magnetically separating the obtained powder to remove impurities. In this case, the crushing method is not particularly limited.

The method of magnetic separation is not particularly limited, and for example, impurities may be removed several times using a magnet.

MODE FOR INVENTION

Hereinafter, the present disclosure will be described in detail with reference to examples. However, the examples according to the present disclosure may be modified into various different forms, and the scope of the present disclosure is not interpreted as being limited to the examples described below. The examples of the present specification are provided to more completely explain the present disclosure to those skilled in the art.

Example 1

95 g of manganese (purity: 99.95%; purchased from Taewon Scientific Co., Ltd.) and 5 g of high-purity graphite (purity: 99.5%; purchased from Taewon Scientific Co., Ltd.) were placed in a water-cooled copper crucible of an argon plasma arc melting apparatus (manufactured by Labold AG, Germany, Model: vacuum arc melting furnace Model LK6/45), and melted at 2,000 K under an argon atmosphere. The melt was cooled to room temperature at a cooling rate of $10^4$ K/min to obtain an alloy ingot. The alloy ingot was crushed to a particle size of 1 mm or less by hand grinding. Thereafter, the obtained powders were magnetically separated using a Nd-based magnet to remove impurities repeatedly, and the $Mn_4C$ magnetic powders were collected. The collected $Mn_4C$ magnetic powders were subjected to X-ray diffraction (XRD) analysis (measurement system: D/MAX-2500 V/PO, Rigaku; measurement condition: Cu—$K_\alpha$ ray) and energy-dispersive X-ray spectroscopy (EDS) using FE-SEM (Field Emission Scanning Electron Microscope, MIRA3 LM).

Figure 2:
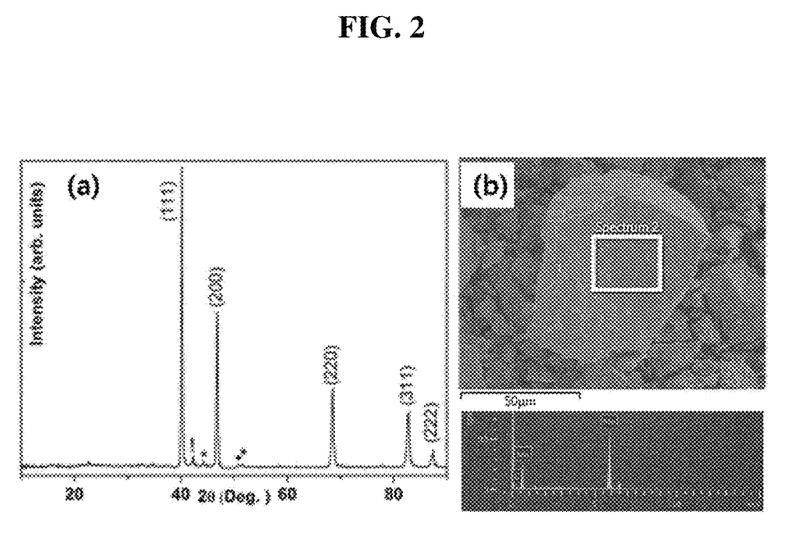
FIG. 2 is a view showing an X-ray diffraction pattern and an energy-dispersive X-ray spectroscopy spectrum of a $Mn_4C$ magnetic material produced according to Example 1 of the present disclosure, respectively.

FIGS. 2(a) and 2(b) show an X-ray diffraction pattern and an energy-dispersive X-ray spectroscopy graph of the $Mn_4C$ magnetic material produced according to Example 1 of the present disclosure, respectively.

As can be seen in FIG. 2(a), the $Mn_4C$ magnetic material showed diffraction peaks of (111), (200), (220), (311) and (222) crystal planes at 2θ values of 40°, 48°, 69°, 82° and 88°, respectively, in the XRD analysis. Thus, it can be seen that the XRD patterns of the $Mn_4C$ magnetic material produced according to Example 1 are well consistent with the patterns of the cubic perovskite $Mn_4C$. In addition, the $Mn_4C$ magnetic material shows several very weak diffraction peaks that can correspond to $Mn_{23}C_6$ and Mn. That is, the diffraction peak intensity at 2θ values of 43° and 44°, which correspond to Mn and $Mn_{23}C_6$ impurities, is as very low as about 2.5% of the diffraction intensity of the peak corresponding to the (111) plane. Through this, it can be seen that the powders obtained in Example 1 have high-purity $Mn_4C$ phase. The lattice parameter of the $Mn_4C$ is estimated to be about 3.8682 Å.

FIG. 2(b) shows the results of analyzing the atomic ratio of Mn:C in the powder by EDS. The atomic ratio of Mn:C is 80.62:19.38, which is very close to 4:1 within the experimental uncertainties. Thus, it can be seen that the powder is also confirmed to be $Mn_4C$.

The M-T curve of the field aligned $Mn_4C$ powder obtained in Example 1 was measured under an applied field of 4 T and at a temperature ranging from 50 K to 400 K. Meanwhile, the M-T curve of the randomly oriented $Mn_4C$ powder was measured under an applied field of 1 T. The Curie temperature of $Mn_4C$ was measured under 10 mT while decreasing temperature from 930 K at a rate of 20 K/min.

Figure 3:
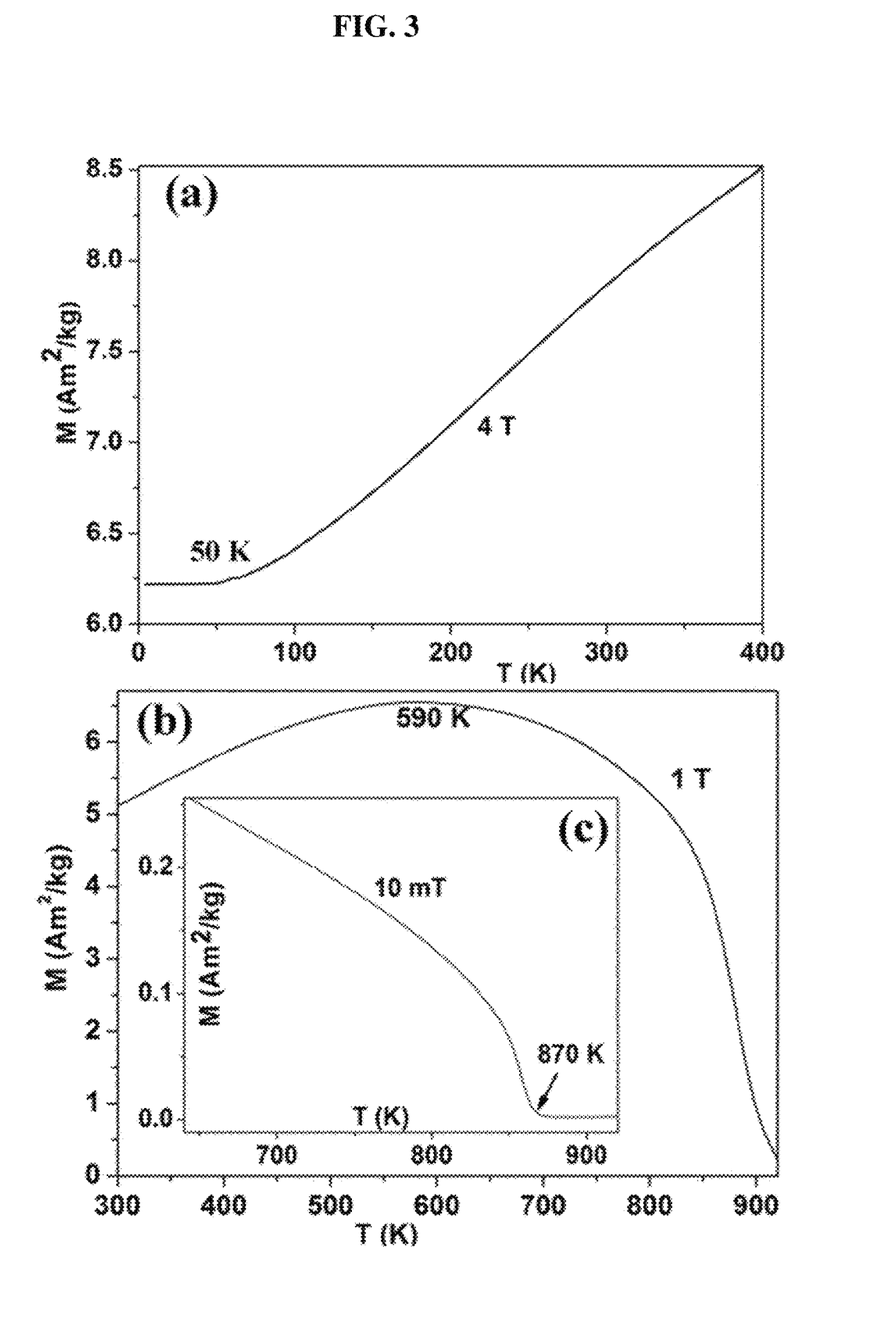
FIG. 3 is a graph showing the magnetization-temperature (M-T) curves of the $Mn_4C$ magnetic material, produced according to Example 1 of the present disclosure, under magnetic fields of 4 T, 1 T, and 10 mT, respectively.

FIGS. 3(a) to 3(c) show the M-T curves of the $Mn_4C$ magnetic material, produced according to Example 1 of the present disclosure, under magnetic fields of 4 T, 1 T, and 10 mT, respectively.

FIG. 3 shows magnetization-temperature (M-T) curves indicating the results of measuring the temperature-dependent magnetization intensity of the $Mn_4C$ magnetic material, produced in Example 1, using the vibrating sample magnetometer (VSM) mode of Physical Property Measurement System (PPMS®) (Quantum Design Inc.).

According to the Néel theory, the ferrimagnets that contain nonequivalent substructures of magnetic ions may have a number of unusual forms of M-T curves below the Curie temperature, depending on the distribution of magnetic ions between the substructures and on the relative value of the molecular field coefficients. The anomalous M-T curves of $Mn_4C$, as shown in FIG. 3(a), can be explained to some extent by the Néel's P-type ferrimagnetism, which appears when the sublattice with smaller moment is thermally disturbed more easily. For $Mn_4C$ with two sublattices of $Mn_I$ and $Mn_{II}$, as shown in FIG. 1, the $Mn_I$ sublattice might have smaller moment.

FIG. 3(a) shows the temperature dependence of magnetization of the $Mn_4C$ magnetic material produced in Example 1. The magnetization of $Mn_4C$ measured at 4.2K is 6.22 $Am^2$/kg (4 T), corresponding to $0.258\mu_B$ per unit cell. The magnetization of the $Mn_4C$ magnetic material varies little at temperatures below 50 K, and is quite different from that of most magnetic materials, which undergo a magnetization deterioration with increasing temperature due to thermal agitation. Furthermore, the magnetization of the $Mn_4C$ magnetic material increases linearly with increasing temperature at temperatures above 50 K. The linear fitting of the magnetization of $Mn_4C$ at 4 T within the temperature range of 100 K to 400 K can be written as M=0.0072T+ 5.6788, where M and T are expressed in $Am^2$/kg and K, respectively. Thus, the temperature coefficient of magnetization of $Mn_4C$ is estimated to be about $\sim2.99*10^{-4}\mu_B$/K per unit cell. The mechanisms of the anomalous thermomagnetic behaviors of $Mn_4C$ may be related to the magnetization competition of the two ferromagnetic sublattices ($Mn_I$ and $Mn_{II}$) as shown in FIG. 1.

FIG. 3(b) shows the M-T curves of the $Mn_4C$ powders at temperatures within the range of 300 K to 930 K under 1 T. The linear magnetization increment stops at 590 K, above which the magnetization of $Mn_4C$ starts to decrease slowly first and then sharply at a temperature of about 860 K. The slow magnetization decrement at temperatures above 590 K is ascribed to the decomposition of $Mn_4C$, which is proved by further heat-treatment of $Mn_4C$ as described below.

According to one embodiment of the present disclosure, the saturation magnetization of $Mn_4C$ increases linearly with increasing temperature within the range of 50 K to 590 K and remains stable at temperatures below 50 K. The increases in anomalous magnetization of $Mn_4C$ with increasing temperature can be considered in terms of the Néel's P-type ferrimagnetism. At temperatures above 590 K, the $Mn_4C$ decomposes into $Mn_{23}C_6$ and Mn, which are partially oxidized into the manganosite when exposed to air. The remanent magnetization of $Mn_4C$ varies little with temperature. The Curie temperature of $Mn_4C$ is about 870 K. The positive temperature coefficient (about 0.0072 $Am^2$/kgK) of magnetization in $Mn_4C$ is potentially important in controlling the thermodynamics of magnetization in magnetic materials.

The Curie temperature $T_e$ of $Mn_4C$ is measured to be about 870 K, as shown in FIG. 3(c). Therefore, the sharp magnetization decrement of $Mn_4C$ at temperatures above 860 K is ascribed to both the decomposition of $Mn_4C$ and the temperature near the Tc of $Mn_4C$.

Figure 4:
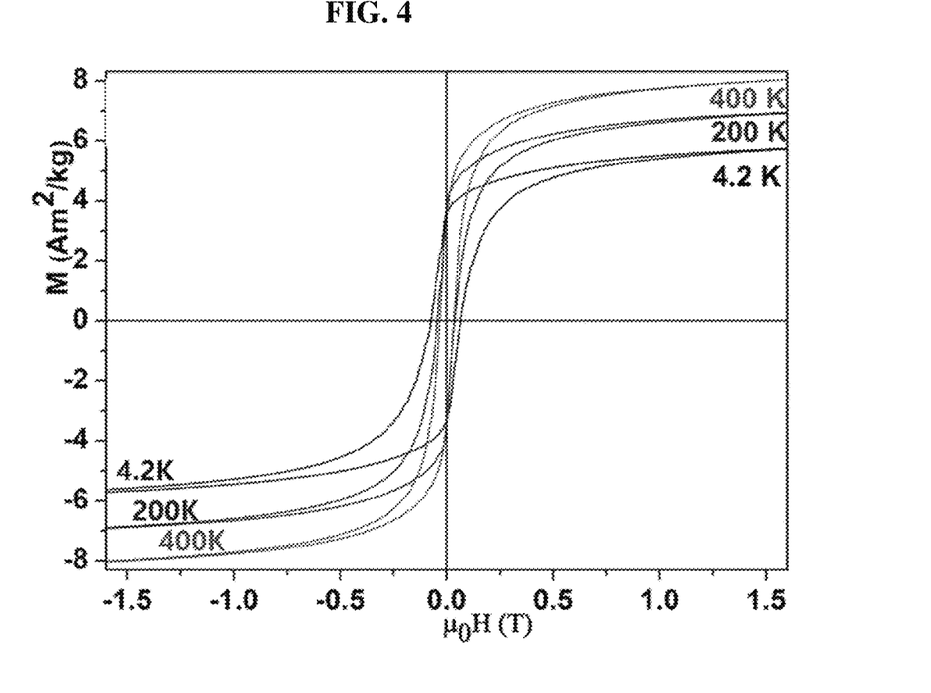
FIG. 4 is a graph showing the magnetic hysteresis loops of the $Mn_4C$ magnetic material, produced according to Example 1 of the present disclosure, at 4.2 K, 200 K and 400 K.

FIG. 4 is a graph showing the magnetic hysteresis loops of the $Mn_4C$ magnetic material, produced according to Example 1 of the present disclosure, at 4.2 K, 200 K and 400 K. The magnetic hysteresis loops were measured by using the PPMS system (Quantum Design) under a magnetic field of 7 T while the temperature was changed from 4 K to 400 K.

As shown in FIG. 4, the positive temperature coefficient of magnetization was further proved by the magnetic hysteresis loops of $Mn_4C$ as shown in FIG. 4. The $Mn_4C$ shows a much higher magnetization at 400 K than that at 4.2 K. Moreover, the remanent magnetization of $Mn_4C$ varies little with temperature and is $\Delta 3.5$ $Am^2$/kg within the temperature range of 4.2 K to 400 K. The constant remanent magnetization of $Mn_4C$ within a wide temperature range indicates the high stability of magnetization against thermal agitation. The coercivities of $Mn_4C$ at 4.2 K, 200 K, and 400 K were 75 mT, 43 mT, and 33 mT, respectively.

The magnetic properties of $Mn_4C$ measured are different from the previous theoretical results. A corner $Mn_I$ moment of $3.85\mu_B$ antiparallel to three face-centered $Mn_{II}$ moments of $1.23\mu_B$ in $Mn_4C$ was expected at 77 K. The net moment per unit cell was estimated to be $0.16\mu_B$. In the above experiment, the net moment in pure $Mn_4C$ at 77 K is $0.26\mu_B$/unit cell, which is much larger than that expected by Takei et al. It was reported that the total magnetic moment of $Mn_4C$ was calculated to be about $1\mu_B$, which is almost four times larger than the $0.258\mu_B$ per unit cell measured at 4.2 K, as shown in FIG. 4.

Figure 5:
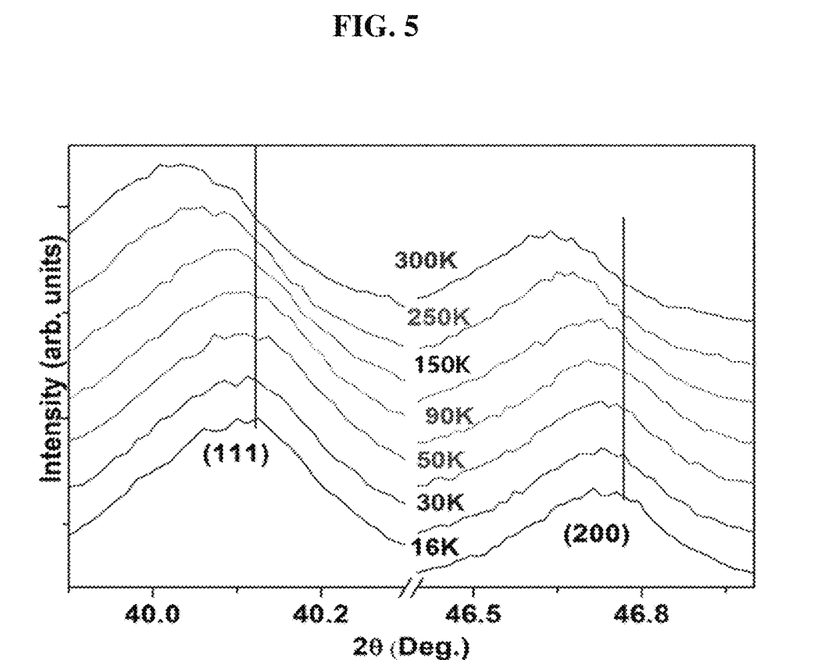
FIG. 5 is an enlarged view of the temperature-dependent XRD patterns of the $Mn_4C$ magnetic material produced according to Example 1 of the present disclosure.

FIG. 5 is an enlarged view of the temperature-dependent XRD patterns of the $Mn_4C$ magnetic material produced according to Example 1 of the present disclosure.

The thermomagnetic behaviors of $Mn_4C$ are related to the variation in the lattice parameters of $Mn_4C$ with temperature. It is known that the distance of near-neighbor manganese atoms plays an important role in the antiferro- or ferro-magnetic configurations of Mn atoms. Ferromagnetic coupling of Mn atoms is possible only when the Mn—Mn distance is large enough. FIG. 5 shows the diffraction peaks of the (111) and (200) planes of $Mn_4C$ at temperatures from 16 K to 300 K. With increasing temperature, both (111) and (200) peaks of $Mn_4C$ shifted to a lower degree at temperatures between 50 K and 300 K, indicating an enlarged distance of Mn—Mn atoms in $Mn_4C$. No peak shift is obviously observed for $Mn_4C$ at temperatures below 50 K. The distance of nearest-neighbor manganese atoms plays an important role in the antiferro- or ferro-magnetic configurations of Mn atoms and thus has a large effect on the magnetic properties of the compounds.

Thus, it can be seen that the abnormal increase in magnetization of $Mn_4C$ with increasing temperature occurs due to the variation in the lattice parameters of $Mn_4C$ with temperature.

Figure 6:
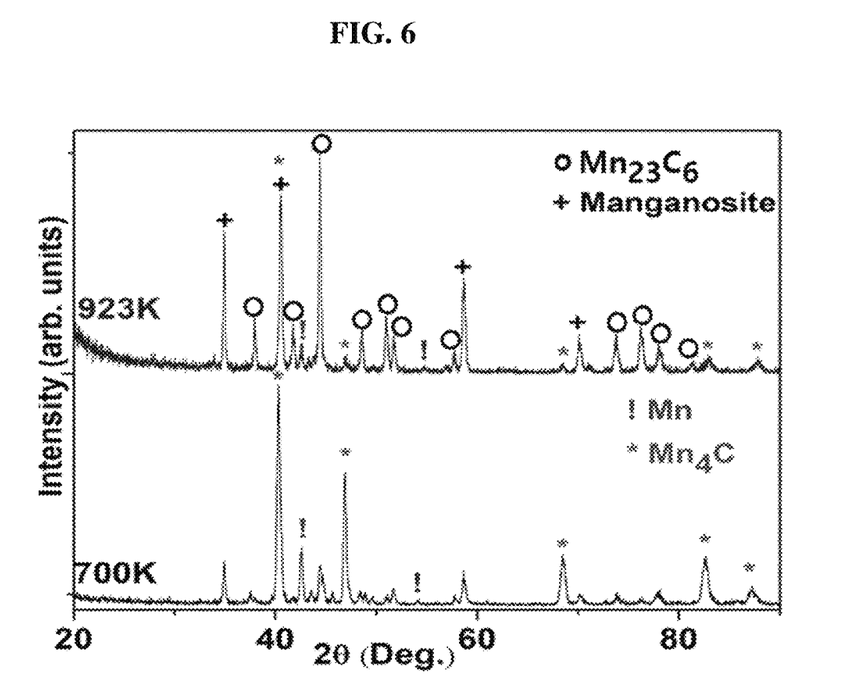
FIG. 6 is a view showing XRD patterns after annealing the $Mn_4C$ magnetic material produced according to Example 1 of the present disclosure.

The powder produced in Example 1 was annealed in vacuum for 1 hour at each of 700 K and 923 K, and then subjected to X-ray spectroscopy, and the results thereof are shown in FIG. 6.

The magnetization reduction of $Mn_4C$ at temperatures above 590 K is ascribed to the decomposition of $Mn_4C$, which is proved by the XRD patterns of the powders after annealing $Mn_4C$ at elevated temperatures. FIG. 6 shows the structural evolution of $Mn_4C$ at elevated temperatures. When $Mn_4C$ is annealed at 700 K, a small fraction of $Mn_4C$ decomposes into a small amount of $Mn_{23}C_6$ and Mn. The presence of manganosite is ascribed to the spontaneous oxidation of the Mn precipitated from $Mn_4C$ when exposed to air after annealing. The fraction of $Mn_{23}C_6$ was enhanced significantly for $Mn_4C$ annealed at 923 K, as shown in FIG. 6.

These results prove that the metastable $Mn_4C$ decomposes into stable $Mn_{23}C_6$ at temperatures above 590 K. The presence of $Mn_4C$ in the powder annealed at 923 K indicates a limited decomposition rate of $Mn_4C$, from which the Tc of $Mn_4C$ can be measured. Both $Mn_{23}C_6$ and Mn are weak paramagnets at ambient temperature and elevated temperatures. Therefore, the magnetic transition of the $Mn_4C$ magnetic material at 870 K is ascribed to the Curie point of the ferrimagnetic $Mn_4C$.

The $Mn_4C$ shows a constant magnetization of $0.258\mu_B$ per unit cell below 50 K and a linear increment of magnetization with increasing temperature within the range of 50 K to 590 K, above which $Mn_{23}C_6$ precipitates from $Mn_4C$. The anomalous M-T curves of $Mn_4C$ can be considered in terms of the Néel's P-type ferrimagnetism.

The invention claimed is:

1. A $Mn_4C$ magnetic material showing diffraction peaks of (111), (200), (220), (311) and (222) crystal planes at 2θ values of 40°, 48°, 69°, 82° and 88°, respectively, in an XRD analysis.

2. The $Mn_4C$ magnetic material of claim 1, wherein the diffraction peak intensity at 2θ values of 43° and 44°, which correspond to impurities, is equal to or less than 2.5% of the diffraction peak intensity of the (111) crystal plane in the XRD analysis.

3. The $Mn_4C$ magnetic material of claim 1, wherein magnetization of the $Mn_4C$ magnetic material starts to increase in a temperature range of 30 K to 80 K, and the increased magnetization thereof is maintained in a temperature range of 540 K to 640 K.

4. A method for producing the $Mn_4C$ magnetic material according to claim 1, the method comprising:
   melting a mixture of manganese and carbon-based compound to obtain a metal mixture;
   cooling the melted mixture to produce an alloy ingot; and
   crushing the alloy ingot, and then removing impurities by magnetic separation.

5. The method of claim 4, wherein the carbon-based compound is one or more selected from graphite, graphene, carbon nanotubes, and carbon fibers.

6. The method of claim 4, wherein the mixture of manganese and carbon-based compound comprises 93 to 97 wt % of manganese and 3 to 7 wt % of the carbon-based compound.

7. The method of claim 4, wherein the melting is performed by a plasma arc melting method.

8. The method of claim 4, wherein the melting is performed at a temperature of 1,500 to 2,500 K under an inert atmosphere.

9. The method of claim 4, wherein the cooling comprises the cooling the melted mixture to a temperature of 200 K to 300 K at a rate of $10^2$ K/min to $10^5$ K/min.

10. A method for producing the $Mn_4C$ magnetic material according to claim 2, the method comprising:
    melting a mixture of manganese and carbon-based compound to obtain a metal mixture;
    cooling the melted mixture to produce an alloy ingot; and
    crushing the alloy ingot, and then removing impurities by magnetic separation.

11. A method for producing the $Mn_4C$ magnetic material according to claim 3, the method comprising:
    melting a mixture of manganese and carbon-based compound to obtain a metal mixture;
    cooling the melted mixture to produce an alloy ingot; and
    crushing the alloy ingot, and then removing impurities by magnetic separation.

* * * * *